US008721773B2

(12) United States Patent
Perkins, II et al.

(10) Patent No.: US 8,721,773 B2
(45) Date of Patent: May 13, 2014

(54) METHOD FOR PREPARING A PALLADIUM-GOLD ALLOY GAS SEPARATION MEMBRANE SYSTEM

(75) Inventors: Nathan Earl Perkins, II, League City, TX (US); John Charles Saukaitis, Katy, TX (US)

(73) Assignee: Shell Oil Company, Houston, TX (US)

( * ) Notice: Subject to any disclaimer, the term of this patent is extended or adjusted under 35 U.S.C. 154(b) by 200 days.

(21) Appl. No.: 13/282,295

(22) Filed: Oct. 26, 2011

(65) Prior Publication Data
US 2013/0104740 A1 May 2, 2013

(51) Int. Cl.
*B01D 53/22* (2006.01)
*B01D 71/02* (2006.01)
*B01D 69/12* (2006.01)

(52) U.S. Cl.
USPC ........... 96/11; 95/56; 427/270; 427/383.1; 427/404

(58) Field of Classification Search
USPC ........... 96/4, 11; 95/45, 55, 56; 427/270, 331, 427/383.1, 404
See application file for complete search history.

(56) References Cited

U.S. PATENT DOCUMENTS

| 3,350,845 A | 11/1967 | McKinley | 55/16 |
| 7,744,675 B2 | 6/2010 | Saukaitis et al. | 95/55 |
| 2004/0237780 A1* | 12/2004 | Ma et al. | 95/55 |
| 2004/0244590 A1* | 12/2004 | Ma et al. | 96/11 |
| 2009/0277331 A1* | 11/2009 | Li et al. | 96/11 |
| 2011/0232821 A1 | 9/2011 | Saukaitis et al. | 156/60 |

FOREIGN PATENT DOCUMENTS

WO  WO2008027646  3/2008  ........... B05D 3/02

OTHER PUBLICATIONS

Hu, Jiandong et al., "Novel plating solution for electroless deposition of gold film onto glass surface", 2008, Surface and Coatings Technology, 202, pp. 2922-2926.*
"Coversion Chart Abrasives—Grit Sizes", retrieved online from www.fine-tools.com/G10019.htm on Sep. 4, 2013.*
Jiandong Hu, et al., "Novel plating solution for electroless deposition of gold film onto glass surface", Surface and Coatings Technology (2008) 202 (13), pp. 2922-2926, published by Elsevier.

* cited by examiner

*Primary Examiner* — Jason M Greene
(74) *Attorney, Agent, or Firm* — Charles W. Stewart

(57) ABSTRACT

A method for preparing a palladium-gold alloy gas separation membrane system comprising a gold-palladium alloy membrane on a porous substrate coated with an intermetallic diffusion barrier. The method includes an abrading step to increase surface roughness of the palladium to a desired range, a gold plating step with a solution of chloroauric acid ($AuCl_4H$) and hydrogen peroxide, followed by annealing to produce a palladium-gold alloy membrane.

20 Claims, No Drawings

METHOD FOR PREPARING A PALLADIUM-GOLD ALLOY GAS SEPARATION MEMBRANE SYSTEM

FIELD OF THE INVENTION

This invention relates to an improved method for preparing a palladium-gold alloy gas separation membrane system comprising a gold and palladium membrane on a coated porous support, and to the gas separation membrane system thereby produced.

BACKGROUND OF THE INVENTION

Inexpensive sources of purified hydrogen are sought after for many industrial chemical processes and in the production of energy in fuel cell power systems. Similarly, inexpensive methods of purifying hydrogen could significantly expand the applicability of hydrocarbon reforming, reforming reactors and the water gas shift reaction. In order to meet the need for inexpensive purified hydrogen, considerable research effort has been devoted to developing more effective hydrogen permeable gas separation membrane systems which can be used to selectively recover hydrogen from different industrial gas streams containing hydrogen and other molecular components. Hydrogen-permeable membranes made of palladium have been widely studied due to their high hydrogen permeability, and their theoretically infinite hydrogen selectivity. However, one of the problems with palladium membranes, in addition to their high cost, is that they are susceptible to poisoning by hydrogen sulfide which is formed when sulfur sources present in the industrial process gases come in contact with the palladium membrane at a high temperature.

In an attempt to overcome these problems with pure palladium membranes, alloys of palladium have been formulated, such as the alloys of palladium with copper, silver and gold disclosed in U.S. Pat. No. 3,350,845, which were found to have improved resistance to poisoning by hydrogen sulfide. The palladium-gold alloys disclosed in U.S. Pat. No. 3,350,845 were prepared in the form of 1 mil thick foils supported on $\frac{1}{16}$" thick stainless steel substrates. The specific method used to prepare these palladium-gold alloy foils was not disclosed, and apparently involved conventional foil preparation technology. The relatively thick palladium-gold alloy foils disclosed in U.S. Pat. No. 3,350,845 are prohibitively expensive, and would not be suitable for many current industrial applications.

One known method of plating gold is by use of an electrolytic process in which a current is passed through a solution containing a gold salt, such as gold cyanide. The cyanide waste from such a bath presents an environmental problem. To avoid this environmental problem, other gold salts such as gold sulfite and gold thiosulfite have been employed. However, these salts would not be suitable for plating gold on palladium since palladium is poisoned by sulfur compounds.

Another method of plating gold on the surface of a metal involves galvanic displacement using chloroauric acid. In this method, a metal such as nickel, which is more easily oxidized than gold, is electrolessly deposited on the surface on which gold is to be deposited. The freshly deposited metal, e.g., nickel, is readily dissolved by the action of chloroauric acid, which results in the gold ion in solution being reduced, and replacing the surface metal. Galvanic displacement methods using chloroauric acid would not be feasible for depositing gold on palladium membranes to produce sulfur-resistant membranes, because of the high cost of palladium which would be displaced by the gold. Also, palladium membranes are typically annealed and may be polished, which provides them with a smooth surface that is difficult to plate.

Chloroauric acid has also been used to deposit gold films onto other surfaces such as glass. For example, a paper by Jiandong Hu et al, entitled "Novel Plating solution for electroless plating of gold film onto glass surface", Surface and Coatings Technology (2008), 202 (13), 2922-2926, published by Elsevier, describes an electroless gold plating process in which chloroauric acid and hydrogen peroxide were used to deposit a gold film onto (3-aminopropyl)-trimethoxysilane-coated glass. The Jiandong Hu et al paper teaches that in order to achieve the deposition of gold onto insulating substrates, the inert surface must be activated or functionalized with the use of silanizing agents, such as (3-aminopropyl)-trimethoxysilane (APTMS) to enhance the gold adhesion to the substrate. The method of preparation of the surface of the glass was quite extensive and involved a cleaning treatment to remove surface contamination, an oxidation treatment with piranha solution to form an oxygenated species on the glass surface, and a modifying treatment with a silanizing reagent to such as APTMS to form the modified glass surface. The multi-step method disclosed in this paper was employed to prepare gold coated glass slides. There is no disclosure in the paper regarding the preparation of gas separation membranes.

A more recent approach to preparing a sulfur-resistant palladium-gold membrane is described in WO 2008/027646, in which a sulfur-resistant composite palladium alloy membrane was prepared by seeding a porous substrate with palladium crystallites, decomposing any organic liquids present on the substrate, reducing the palladium crystallites on the substrate to the metallic form, depositing a film of palladium metal on the substrate and then depositing a second, gold film on the palladium film. The deposition of the gold film was accomplished by pumping a solution containing water, NaOH and gold (III) chloride over the surface of the substrate.

While the method disclosed in WO 2008/027646 involving seeding with palladium crystallites and use of a NaOH and gold (III) chloride plating solution, provides a sulfur-resistant composite gas separation membrane, there is a continuing need in the art for fabrication methods capable of inexpensively and efficiently producing gas separation membrane systems which are resistant to poisoning by sulfur.

The present invention provides an inexpensive, highly efficient, and environmentally friendly method for preparing a sulfur-resistant, thermally stable, gold-palladium alloy gas separation membrane system. This method does not involve galvanic displacement, does not require the use of palladium crystallites, and does not require any expensive activation, cleaning or functionalization techniques.

BRIEF SUMMARY OF THE INVENTION

The present invention provides a method of preparing a palladium-gold alloy gas separation membrane system, which method comprises abrading a palladium layer with an abrasion media to produce a certain surface roughness as hereinafter described; contacting the abraded palladium surface with a solution comprising chloroauric acid or a salt thereof and hydrogen peroxide for a period of time sufficient to deposit a layer of gold on the layer of palladium; and, annealing the palladium and gold layers to produce the palladium-gold alloy gas separation membrane system.

The palladium-gold alloy gas separation membrane system prepared by the inventive method may also comprise a porous substrate on which an intermetallic diffusion barrier may be applied. In this embodiment of the invention an intermetallic diffusion barrier is applied to a porous substrate; one or more layers of palladium or a palladium alloy is deposited on the intermetallic diffusion barrier; the surface of the palladium layer is abraded using an abrasive media to achieve a desired surface roughness; one or more layers of gold is then deposited on the palladium layer by contacting the abraded palladium layer with a solution comprising chloroauric acid or a salt thereof and hydrogen peroxide. The gold coated palladium layer is annealed to produce a gold-palladium alloy layer on the coated porous support.

The present invention also includes the palladium-gold alloy gas separation membrane system prepared using the afore-described methods, and the use of such gas separation membrane system in separating hydrogen from a hydrogen and sulfur containing gas stream.

DETAILED DESCRIPTION OF THE INVENTION

The present invention provides an inexpensive and highly efficient method to apply a layer or coating of gold to a layer of palladium, which gold coated palladium layer can be annealed to produce a palladium-gold alloy gas separation membrane system.

The present invention is based in part on the discovery that gold can be applied to a palladium surface without the need for expensive activation, cleaning, or functionalization techniques, by the steps of (1) abrading the surface of the palladium layer to achieve a certain surface roughness, and (2) contacting the abraded palladium surface with a solution comprising chloroauric acid or a salt thereof and hydrogen peroxide for a period of time sufficient to provide the gold coated palladium layer, which can be annealed to produce a palladium-gold alloy gas separation membrane.

The polishing or abrading of the palladium surface is typically performed in order to produce a smoother palladium surface on which subsequent layers of palladium can be deposited. The abrading step in the present method is performed to increase surface roughness, e.g., by intentionally scratching or cross-hatching the palladium surface with an abrasive material. Thus, the term "abrading" as employed in the present specification and claims is defined to mean the application of an abrasive media to a palladium surface to increase surface roughness, e.g., by scratching or cross-hatching the surface of the palladium. The term "polishing" as employed in this specification and the claims is defined to mean the application of an abrasive media to a palladium surface to decrease surface roughness, i.e., to the make the surface of the palladium smoother.

Thus, an important feature of the inventive method is the abrading step in which a desired palladium surface roughness is achieved by abrasion or grinding. It has been found that if the palladium surface has an appropriate surface roughness as hereinafter described, it is possible to coat the palladium surface with a layer or coating of gold by contacting the palladium surface with a solution comprising chloroauric acid or a salt thereof and hydrogen peroxide without the need for expensive and time consuming chemical activation and/or functionalization steps.

In order to coat a relatively smooth palladium surface (which is defined as a palladium surface having a mean surface roughness (Sa) of below 0.8 microns) with gold employing the chloroauric acid and hydrogen peroxide solution, the palladium surface must be abraded to increase surface roughness. In accordance with the invention, the palladium surface prior to plating with the chloroauric acid and hydrogen peroxide solution, must have a mean surface roughness (Sa) above 0.8 microns up to 2.5 microns. Preferably the mean surface roughness (Sa) is between 0.85 microns and 1.5 microns, more preferably between 0.9 microns and 1.2 microns.

The mean surface roughness or arithmetical mean height (Sa) is a known measurement for measuring the roughness of a surface and can be readily determined with the use of an optical profilometer. Any commercially available optical profilometer may be used. An example of such a commercially available optical profilometer is the ST400 3D Profilometer, which is marketed and sold by Nonovea.

Abrasives suitable for use in the abrading step to produce the desired surface roughness can be selected from any type of abrasive, such as, bonded abrasives, coated abrasives, and loose abrasives, including abrasive particles suspended in a liquid or abrasives contained in a paste. The size of the abrading particles should be such that they function to increase the surface roughness of the palladium surface when used in the abrading step. Abrasion media having an average particle size of from 1 to 10 microns have been found to produce a suitable surface roughness. However, other abrasion media having an average particle size above or below this range can be used as long as they produce a final mean surface roughness (Sa) of above 0.8 microns to 2.5 microns.

The surface roughness may be in the form of a lay pattern, which is a repetitive impression on the surface of the palladium. Examples of surface finish lay patterns include vertical, horizontal, radial, cross-hatched, circular, sinusoidal, oval, elliptical, coil, peanut shaped and other patterns. Suitable and preferred lay patterns and some of the methods and means for impressing or imposing such lay patterns upon a palladium surface are discussed in more detail in U.S. Published Application No. 2011-0232821, which is incorporated herein by reference.

The composition of the abrasive particles is not critical and the abrasive particles may be selected from the natural abrasives, such as, for example, diamond, corundum, emery, and silica, or from the manufactured abrasives, such as, for example, silicon carbide, aluminum oxide (fused, sintered, sol-gel sintered), boron carbide, and cubic boron nitride.

Following the abrading of the palladium surface to the desired surface roughness, one or more layers of gold are deposited on the palladium surface with the use of a special plating solution comprising chloroauric acid ($HAuCl_4$) and hydrogen peroxide. The plating solution may also comprise hydrogen peroxide and a salt of chloroauric acid, such as the potassium and sodium salts thereof. The concentration of chloroauric acid in the gold plating solution will generally be in the range of from 0.001 wt % to 0.2 wt %, preferably from 0.005 wt % to 0.05 wt %, based on the weight of the solution. The concentration of hydrogen peroxide in the gold plating solution will generally be in the range of 0.01 wt % to 0.1 wt %, preferably 0.01 wt % to 0.05 wt %.

The gold can be layered, i.e., deposited in multiple layers, or deposited in one layer. The thickness of the gold coating, when used in a palladium-gold alloy gas separation system, can range from a fraction of a micron, (e.g., 0.1 micron) to 7 microns or more, preferably from 0.25 micron to 7 microns.

In a preferred embodiment of the invention, the palladium-gold alloy gas separation membrane system is supported upon a porous substrate coated with an intermetallic diffusion barrier. In this embodiment, an intermetallic diffusion barrier is applied to a porous substrate; one or more layers of palladium or a palladium alloy is deposited on the intermetallic diffusion barrier; the surface of the palladium layer is abraded using an abrasive media to achieve a desired surface roughness; one or more layers of gold are then deposited on the palladium layer by contacting the abraded palladium layer with a solution comprising chloroauric acid or a salt thereof and hydrogen peroxide. After deposition of the gold layer(s) on the palladium layer(s), the combined layers are heat treated, i.e., annealed, to produce the palladium-gold alloy gas separation membrane system coated porous support.

Porous supports which may be employed in this embodiment of the inventive method include any porous metal material that is suitable for use as a support for the intermetallic diffusion barrier and the layer(s) of palladium and/or palladium-gold alloy. The porous support may be of any shape or geometry; provided, that, it has a surface that permits the application thereto or deposition thereon of the intermetallic diffusion barrier and layer(s) of palladium, palladium alloys and gold. Such shapes can include planar or curvilinear sheets of the porous metal material having an undersurface and a top surface that together define a sheet thickness, or the shapes can be tubular, such as, for example, rectangular, square and circular tubular shapes that have an inside surface and an outside surface that together define a wall thickness and with the inside surface of the tubular shape defining a tubular conduit.

The porous metal material can be selected from any of the materials known to those skilled in the art including, but not limited to, the stainless steels, such as, for example, the 301, 304, 305, 316, 317, and 321 series of stainless steels, the HASTELLOY® alloys, for example, HASTELLOY® B-2, C-4, C-22, C-276, G-30, X and others, and the INCONEL® alloys, for example, INCONEL® alloy 600, 625, 690, and 718. The porous metal material, thus, can comprise an alloy that is hydrogen permeable and which comprises iron and chromium. The porous metal material may further comprise an additional alloy metal selected from the group consisting of nickel, manganese, molybdenum and any combination thereof.

One particularly desirable alloy suitable for use as the porous metal material can comprise nickel in an amount in the range of upwardly to about 70 weight percent of the total weight of the alloy and chromium in an amount in the range of from 10 to 30 weight percent of the total weight of the alloy. Another suitable alloy for use as the porous metal material comprises nickel in the range of from 30 to 70 weight percent, chromium in the range of from 12 to 35 weight percent, and molybdenum in the range of from 5 to 30 weight percent, with these weight percents being based on the total weight of the alloy. The Inconel alloys are preferred over other alloys.

The thickness (e.g. wall thickness or sheet thickness as described above), porosity, and pore size distribution of the pores of the porous metal substrate are properties of the porous support selected in order to provide a gas separation membrane system of the invention that has the desired properties and as is required in the manufacture of the gas separation membrane system of the invention. It is understood that, as the thickness of the porous support increases, when it is used in hydrogen separation applications, the hydrogen flux will tend to decrease. The operating conditions, such as pressure, temperature and fluid stream composition, may also impact the hydrogen flux. But, in any event, it is desirable to use a porous support having a reasonably small thickness so as to provide for a high gas flux therethrough. The thickness of the porous substrate for the typical application contemplated hereunder can be in the range of from about 0.1 mm to about 25 mm, but, preferably, the thickness is in the range of from 1 mm to 15 mm, and, more preferably, from 2 mm to 12.5 mm, and, most preferably, from 3 mm to 10 mm.

The porosity of the porous metal substrate can be in the range of from 0.01 to about 1. The term porosity is defined as the proportion of non-solid volume to the total volume (i.e. non-solid and solid) of the porous metal substrate material. A more typical porosity is in the range of from 0.05 to 0.8, and, even, from 0.1 to 0.6.

The pore size distribution of the pores of the porous metal substrate can vary with the median pore diameter of the pores of the porous metal substrate material typically being in the range of from about 0.1 micron to about 50 microns. More typically, the median pore diameter of the pores of the porous metal substrate material is in the range of from 0.1 micron to 25 micron, and, most typically, from 0.1 micron to 15 microns.

The improved method of the invention includes the application of an intermetallic diffusion barrier to the surface of the porous substrate, prior to forming thereon layers of palladium or palladium alloys and gold. Suitable intermetallic diffusion barriers include particles of a material selected from the group consisting of inorganic oxides, refractory metals and noble metal eggshell catalyst. These particles are to be of the size so that they, or at least a portion of the particles, can fit, at least partially, within certain of the pores of the porous substrate used to support the palladium-gold membrane. Thus, they generally should have a maximum dimension of less than about 50 microns ($\mu$m). The particle size (i.e., the maximum dimension of the particle) of the particles will, also, generally, depend on the pore size distribution of the pores of the porous substrate used in the inventive method. Typically, the median particle size of the particles of inorganic oxides, refractory metals or noble metal eggshell catalyst will be in the range of from 0.1 micron to 50 microns. More specifically, the median particle size is in the range of from 0.1 micron to 15 microns. It is preferred for the median particle size of the particles to be in the range of from 0.2 micron to 3 micron.

Examples of inorganic oxides that may suitably be used as the layer of intermetallic diffusion barrier particles include alumina, silica, zirconia, stabilized zirconias such as yttria or ceria stabilized zirconia, titania, ceria, silicon, carbide, chromium oxide, ceramic materials, and zeolites. The refractory metals may include tungsten, tantalum, rhenium, osmium, iridium, niobium, ruthenium, hafnium, zirconium, vanadium, chromium and molybdenum. As for the noble metal eggshell catalyst that may suitably be used as a layer of intermetallic diffusion barrier particles that is applied to the surface of the porous substrate, the noble metal eggshell catalyst is defined and described in great detail in U.S. Pat. No. 7,744,675, the entire text of which is incorporated herein by reference. A preferred intermetallic diffusion barrier for use in the inventive method is noble metal eggshell catalyst comprising zirconia stabilized with yttria, in particular zirconia stabilized with 6 to 8 wt % yttria. In some cases the addition of ceria has also been found to increase stabilization.

The layer of intermetallic diffusion barrier particles applied to the surface of the porous substrate to provide a coated substrate should be such as to cover the pores of the porous substrate and to provide a layer having a layer thickness that is greater than 0.01 micron, and, generally, in the range of from 0.01 micron to 25 microns. It is preferred for the layer thickness of the intermetallic diffusion barrier to be in the range of from 0.1 micron to 20 microns, and, most preferably, from 2 microns to 3 microns.

Following application of the intermetallic diffusion barrier to the porous substrate, one or more layers of palladium can be deposited on the coated porous substrate using any suitable means or method known to those skilled in the art, such as, for instance, electroless plating, thermal deposition, chemical vapor deposition, electroplating, spray deposition, sputter coating, e-beam evaporation, ion beam evaporation and spray pyrolysis. A preferred deposition method is electroless plating.

In a preferred embodiment of the invention, a palladium plating bath solution comprising water, ammonium hydroxide, tetraaminepalladium (II) chloride and hydrazine is circulated over the coated porous substrate until a palladium layer having a thickness in the range of from 1 to 10 microns is deposited. Preferably, the palladium layer has a thickness in the range of from 1 μm to 8 μm, and, more preferably, from 1 to 5 μm. The resulting palladium layer is washed, annealed and polished. The plating, washing, annealing and polishing steps can be repeated until sufficient palladium is plated to seal the surface.

The annealing or heat treatment of the palladium layer(s) is suitably accomplished at a temperature in the range of from 400° C. to 800° C., and preferably in the range of from 500° C. to 550° C. The annealing of the palladium layer(s) can be carried out in a hydrogen atmosphere or and inert gas such as nitrogen, argon or helium. In a preferred embodiment, the annealing is accomplished in an atmosphere of 100% hydrogen, or an atmosphere comprising a mixture of hydrogen and 3 wt % to 97 wt % of an inert gas selected from the group consisting of nitrogen, argon and helium.

Following deposition, annealing and, optionally, polishing of the last layer of palladium on the coated porous substrate, the surface of the palladium is abraded to produce a mean surface roughness (Sa) within the range specified above, i.e., from above 0.8 microns to 2.5 microns, preferably between 0.85 and 1.5 microns and more preferably between 0.9 and 1.2 microns. It has been found that it is very important for the palladium surface on the coated porous substrate to not be too smooth. If the surface of the palladium layer is highly polished of buffed, the gold will not adequately plate from the solution of chloroauric acid and hydrogen peroxide on to the palladium surface.

The appropriate surface roughness, within the ranges specified above, can be achieved by any abrasion means and methods known in the art. Satisfactory results have been obtained with an abrasion media varying in particle size from 1 to 10 micron, e.g., a 5 micron abrasive paper. The abrasion media can be used to impose various patterns, such as cross-hatching, on the surface of the palladium as discussed above. This has been found to significantly enhance gold plating on the palladium layer(s).

Subsequent to the abrading of the palladium surface on the coated porous substrate to the desired surface roughness, one or more layers of gold are deposited on the palladium surface with the use of a special plating solution comprising chloroauric acid or salts thereof and hydrogen peroxide. The deposition of the layer(s) of gold on the palladium layer(s) is preferably performed by electroless plating in a gold plating bath in which a solution containing water, chloroauric acid and hydrogen peroxide is circulated over the surface of the annealed, abraded palladium layer(s) on the coated porous support. The concentration of chloroauric acid in the gold plating solution will generally be in the range of from 0.001 wt % to 0.2 wt %, preferably from 0.005 wt % to 0.05 wt %. The concentration of hydrogen peroxide in the gold plating solution will generally be in the range of 0.01 wt % to 0.1 wt %, preferably 0.01 wt % to 0.05 wt %.

The gold plating is continued until a gold layer having between 1 wt % and 20 wt. % of the total palladium layer(s) is obtained. Preferably, the gold will comprise between 5 wt % and 20 wt % of the total palladium layer(s), more preferably between 8 wt % and 10 wt % of the total palladium layer(s). The aforementioned percentages of gold can be applied in one or more plating operations.

The thickness of the gold layer or coating can vary from a fraction of a micron, e.g. 0.1 micron or 0.25 micron, up to 7 microns, depending on the number of gold plating steps or the total length of gold deposition. Preferably the thickness of the gold layer is from 0.20 micron to 5 microns, more preferably from 0.25 micron to 2 microns.

Gold can be deposited on the palladium in one layer or deposited as one layer of alternating layers of palladium and gold. It is preferred to put gold on as the last layer on a sealed palladium membrane. Gold has a tendency to stay on the surface so this leads to a surface less sensitive to sulfur poisoning as gold is less sensitive to sulfur poisoning. Because gold is expensive, it is cost effective to only apply a sufficient amount of gold to handle the sulfur content of the feed. The 5 to 20 wt % and 8 to 10 wt % ranges of gold to total palladium layer(s) disclosed above are more than adequate for most feeds.

Following deposition of the gold layer(s) on the palladium layer(s), the resulting metal layers are preferably subjected to an annealing operation sufficient to achieve some intermetallic diffusion of the gold layer into the palladium layer forming a palladium-gold alloy. Suitable annealing temperatures for forming the palladium-gold alloy are in range of from 400° C. to 800° C., preferably from 500° C. to 600° C. In a preferred embodiment, annealing is accomplished by slowly heating the porous substrate with the palladium and gold layers to a temperature in the range of from about 500° C. to or about 600° C. in a hydrogen atmosphere.

The palladium-gold alloy layer formed in this manner preferably has a thickness between 1 micron and 10 microns, preferably between 2 microns and 10 microns. The palladium-gold alloy will typically comprise from between 0.2 wt % and 20 wt % gold based on the total weight of the alloy, preferably between 5 wt % and 20 wt % gold based on the total weight of the alloy.

Further layers of palladium, gold or other metals such as silver, may be formed on the gold layer. Alternatively, palladium and silver layers may be co-deposited on the coated porous substrate, followed by a layer of gold. In another embodiment, palladium, silver and gold layers may be sequentially deposited on the coated porous substrate by electroless plating using the afore-described plating solutions. Silver nitrate can be added to the palladium plating solution if it is desired to form a palladium-silver layer prior to plating with gold.

Gold plating in all of the above alternative embodiments is accomplished with an aqueous solution of chloroauric acid or a salt thereof and hydrogen peroxide. It is preferred to have a least one layer of gold on the surface in contact with the gas to be separated as the gold as a tendency to reside on that surface and will render the surface resistant to poisoning by sulfur even if the gold is not completely alloyed.

The palladium-gold gas separation membrane system prepared by the method of the invention can be used in a wide variety of applications, especially those involving the separation of hydrogen from gas streams that comprise other gases, including gases containing concentrations of sulfur compounds, for example, those selected from the group of gases consisting of carbon dioxide, water, methane or mixtures thereof. In such applications, the temperature conditions can be in the range upwardly to 600° C., for instance, in the range of from 100° C. to 600° C., and the pressure conditions can be in the range upwardly to 60 bar, for instance, in the range of from 1 to 40 bar.

The following examples are provided to further illustrate the invention, but they are, however, not to be construed as limiting its scope.

Example 1

This Example illustrates the manufacture of a sulfur-resistant gas separation membrane system utilizing the inventive method which includes the deposition of one or more layers of gold on one or more layers of palladium deposited on a porous substrate which has been coated with an intermetallic diffusion barrier.

A slurry of noble metal eggshell catalyst comprising palladium and yttria stabilized zirconia was deposited on the surface of 2" OD×6" Inconel porous metal tube to form an intermetallic diffusion barrier having a thickness of 2-3 microns and attached by plating for 5 minutes under 5-8" Hg. Thereafter, a first film of palladium was deposited on the porous tube coated with the intermetallic diffusion barrier by circulating a palladium bath solution containing water, ammonium hydroxide, tetraamine palladium (II) chloride, disodium EDTA and hydrazine, over the surface of the coated porous tube until a first palladium layer having a thickness of 1-2 microns was obtained. The palladium layer is washed, dried, annealed and polished. The plating, washing, drying, annealing and polishing steps were repeated to produce additional palladium layers until the membrane was gas tight. The annealing temperature employed was about 500-550° C.

The surface of the annealed palladium layers was then abraded, (i.e., cross-hatched) with 5 micron abrasive paper to increase the surface roughness of the palladium layer to a mean surface roughness (Sa) of between 0.85 micron and 1.5 microns. The coated porous tube having the annealed, abraded palladium surface layer (also referred to herein as a "composite membrane") was suspended in a plastic lined graduated cylinder containing 750 ml of 0.21% chloroauric acid solution at room temperature. A mini peristaltic pump was utilized for agitation. In addition, the composite membrane was rotated ¼ turn every 15 minutes.

Hydrogen peroxide (30 wt %) was added to the solution in 0.1875 ml doses at initiation, and at 30, 60, 120 and 150 minutes. 12.49 ml of a 1.261 wt % chloroauric acid was added at 180 minutes. Doses of 0.1875 ml of 30 wt % hydrogen peroxide were added at 210 and 240 minutes. The membrane tube was vibrated to remove any bubbles that formed on the surface. The composite membrane was removed after 4½ hours of gold plating. This example of the inventive method produced a gold layer on the composite membrane with an average thickness of 660 nanometers (nm) (0.66 microns). The composite membrane with the palladium and gold layers was subsequently annealed at a temperature of 454-458° C. for 24-800 hours to produce a composite membrane having a palladium-gold alloy layer an average layer thickness of 6.675 microns, and an average palladium concentration of 95% and an average gold concentration of 5%.

Example 2

A 15 inch palladium membrane with a permeance of 42 $m^3/m^2/hr/bar^{0.5}$ was abraded, (i.e., cross-hatched) with 5 micron paper to increase the surface roughness of the palladium layer to a mean surface roughness (Sa) between 0.85 and 1.5 microns. The abraded palladium membrane was coated with PTFE tape on the non-plated area. It was placed in a volume of 1300 ml of 0.05% chloroauric acid solution in 1 L graduated cylinder with plastic bag liner at room temperature, equipped with peristaltic pump agitation. Hydrogen peroxide (30 wt %) was added to the solution in 0.1875 ml doses at 0, 30, 60, 120 and 150 minutes. 12.49 ml of a 1.261 wt. % chloroauric acid is added at 90 minutes another 12.49 ml of 1.261% dose of chloroauric acid was used at the 180 minute mark. The membrane was also rotated ¼ turn every 15 minutes. Additional 0.1875 ml doses of 30 wt % peroxide were added at 210 and 240 minutes. The membrane tube was vibrated to remove any bubbles that formed on the surface. The membrane was removed after 4½ hours of plating. X-ray fluorescence was utilized to determine film thickness. This method produced a gold layer with an average thickness of 660 nm, 0.66 microns. It was annealed in hydrogen for 60 hours at 454-458° C. The initial permeance changed an initial value of 31 $m^3/m^2/hr/bar^{0.5}$ to a final value of 38 $m^3/m^2/hr/bar^{0.5}$.

Example 3

The above example was repeated with a new 15 inch palladium membrane. It was abraded, (i.e., cross-hatched) with 5 micron paper to increase the surface roughness of the palladium layer. It was coated with PTFE tape on the non plated area. The membrane was placed in a volume of 1300 ml of 0.05% Chloroauric acid solution in 1 L graduated cylinder with plastic bag liner at room temperature, equipped with peristaltic pump agitation. Hydrogen peroxide (30 wt %) was added to the solution in 0.1875 ml doses at 0, 30, 60, 120 and 150 minutes. 12.49 ml of a 1.261 wt. % choloroauric acid was added at 90 minutes another 12.49 ml of 1.261% dose of chloroauric acid was used at the 180 minute mark. The membrane was also rotated ¼ turn every 15 minutes. Additional 0.1875 ml doses of 30 wt % hydrogen peroxide were added at 210 and 240 minutes. The membrane tube was vibrated to remove any bubbles that formed on the surface. The membrane was removed after 4½ hours of plating. X-ray fluorescence was utilized to determine film thickness. This method produced a gold layer with an average thickness of 650 nm (0.65 microns.)

This process can be continued to add additional gold. It is preferred to only utilize the minimum amount of gold necessary to achieve the required resistance to the sulfur in the feed composition.

While this invention has been described with reference to preferred embodiments thereof, it will be understood by those skilled in the art that various modifications in form and detail may be made therein without departing from the scope of the invention set forth in the following claims.

That which is claimed:

1. A method for preparing a gold-palladium alloy gas separation membrane, which method comprises:
   Providing a palladium layer having a mean surface roughness (Sa) of less than 0.8 micron;
   abrading said palladium layer with an abrasion media to increase the surface roughness to a mean surface roughness (Sa) above 0.8 micron up to 2.5 microns;
   contacting said abraded palladium surface with a solution comprising chloroauric acid or a salt thereof and hydrogen peroxide for a period of time sufficient to deposit a layer of gold on said layer of palladium, and;
   annealing said palladium and gold layers to produce said palladium-gold alloy gas separation membrane.

2. The method as recited in claim 1, wherein the gold is deposited on said palladium layer by electroless plating employing a plating solution consisting essentially of chloroauric acid and hydrogen peroxide.

3. The method as recited in claim 2, wherein the palladium layer is abraded with an abrasion media having a particle size of from 1 to 10 microns.

4. The method as recited in claim 2, wherein the gold layer deposited on the palladium layer has a thickness of between 0.1 micron and 7 microns.

5. The method as recited in claim 4, wherein the gold layer is between 1 wt % and 20 wt % of the total palladium layers.

6. The method as recited in claim 2, wherein after deposition of said gold layer on said palladium layer, the combined layers are annealed to produce a palladium-gold alloy.

7. The method as recited in claim 6, wherein the palladium layer is abraded to a mean surface roughness (Sa) between 0.85 micron and 1.5 microns prior to contacting with said solution.

8. The method as recited in claim 4, wherein the gold layer deposited on the palladium layer has a thickness of between 0.25 micron and 7 microns.

9. The method as recited in claim 8, wherein the palladium-gold alloy has a thickness of between 1 micron and 10 microns.

10. The method as recited in claim 9, wherein the combined gold and palladium layers are annealed at a temperature between 400° C. and 800° C.

11. The method as recited in claim 10, wherein the palladium layer is abraded to a mean surface roughness (Sa) between 0.9 micron and 1.2 microns prior to contacting with said solution.

12. The method as recited in claim 9 wherein the gold layer is between 5 wt % and 20 wt % of the total palladium layers.

13. A method of preparing a palladium-gold alloy gas separation membrane system, which method comprises:

Applying an intermetallic diffusion barrier to a porous substrate; depositing a palladium layer on said intermetallic diffusion barrier; heat treating said palladium layer to provide a heat treated palladium layer; abrading said heat treated palladium layer to a mean surface roughness (Sa) of above 0.8 microns up to 2.5 microns; and, depositing on said heat treated, abraded palladium layer a gold layer by contacting said heat treated abraded palladium layer with a solution comprising chloroauric acid or a salt thereof and hydrogen peroxide.

14. The method as recited in claim 13, wherein after deposition of said gold layer on said palladium layer, the combined layers are annealed to produce a palladium-gold alloy.

15. The method as recited in claim 14, wherein the palladium layer is abraded to a mean surface roughness (Sa) between 0.85 microns and 1.5 microns prior to contacting with said solution.

16. The method as recited in claim 15, wherein the gold layer deposited on the palladium layer has a thickness of between 0.25 micron and 7 microns.

17. The method as recited in claim 16, wherein the combined gold and palladium layers are annealed at a temperature between 500° C. and 600° C. in a hydrogen atmosphere.

18. A palladium-gold alloy gas separation membrane system prepared by the method of claim 1.

19. A palladium-gold alloy gas separation membrane system prepared by the method of claim 14.

20. The method as recited in claim 13, wherein the intermetallic diffusion barrier comprises zirconia stabilized with yttria.

\* \* \* \* \*